United States Patent
Bohle

(10) Patent No.: US 8,127,278 B2
(45) Date of Patent: Feb. 28, 2012

(54) SYSTEM AND METHOD FOR EXTENDING LEGACY APPLICATIONS WITH UNDO/REDO FUNCTIONALITY

(75) Inventor: Holger Bohle, Dielheim (DE)

(73) Assignee: SAP AG, Walldorf (DE)

( * ) Notice: Subject to any disclaimer, the term of this patent is extended or adjusted under 35 U.S.C. 154(b) by 1553 days.

(21) Appl. No.: 11/540,267

(22) Filed: Sep. 28, 2006

(65) Prior Publication Data

US 2008/0189646 A1 Aug. 7, 2008

(51) Int. Cl.
*G06F 9/44* (2006.01)
(52) U.S. Cl. .................................................... 717/134
(58) Field of Classification Search .................. 717/100, 717/104, 106, 114, 137, 143, 134; 715/207, 715/239, 234, 700; 709/217, 246; 719/315, 719/320; 702/179; 718/101; 707/530; 345/846
See application file for complete search history.

(56) References Cited

U.S. PATENT DOCUMENTS

| | | | | |
|---|---|---|---|---|
| 5,898,871 A | * | 4/1999 | Williamson et al. | 719/315 |
| 7,979,804 B1 | * | 7/2011 | Schang | 715/763 |
| 2002/0059345 A1 | * | 5/2002 | Wang et al. | 707/513 |
| 2002/0109734 A1 | * | 8/2002 | Umezu et al. | 345/846 |
| 2003/0018661 A1 | * | 1/2003 | Darugar | 707/500 |
| 2003/0023953 A1 | * | 1/2003 | Lucassen et al. | 717/106 |
| 2006/0206883 A1 | * | 9/2006 | Sabbouh | 717/146 |
| 2006/0280171 A1 | * | 12/2006 | Wiegert et al. | 370/382 |

OTHER PUBLICATIONS

"Mapping a New User Interface Onto an Existing Integrated Interface" U.S. Appl. No. 11/411,463, filed Apr. 25, 2006.

* cited by examiner

*Primary Examiner* — Tuan Anh Vu
(74) *Attorney, Agent, or Firm* — Kenyon & Kenyon LLP

(57) ABSTRACT

In a system and method for recalling a state in an application, a processor may store in a memory data representing a first set of previously executed commands, the first set representing a current application state, and, for recalling a previously extant application state different than the current application state, the processor may modify the data to represent a second set of commands and may execute in sequence the second set of commands.

26 Claims, 13 Drawing Sheets

SYSTEM AND METHOD FOR EXTENDING LEGACY APPLICATIONS WITH UNDO/REDO FUNCTIONALITY

BACKGROUND

Software programs frequently go through many version cycles. Often, new versions provide maintenance upgrades, such as security enhancements of fixing bugs. New versions can also provide substantive changes such as altering a user interface (UI) or altering the backend processing or functionality. For example, current Enterprise Resource Planning (ERP) systems help to automate business practices by using sophisticated business logic at a back end and dynamic user interfaces on a front end. These ERP systems are highly adaptable to specific business practices and change frequently to reflect changes in the business environment, or the specific business type that the software is being tailored for. However, in some cases, older "legacy" software includes much of the needed functionality base of a software system and all that is required is to upgrade the legacy software to include some additive functionality and a new UI.

However, legacy software applications may have front-end UIs which may be inseparable from backend transactional logic, such as business logic. Due to the inseparability, the newer software may not be able to utilize and integrate with a newer UI the same or similar transactional logic of the older applications. Companies would thus have to rewrite existing transactional logic for the sole purpose of interacting with the newer interfaces. This creates a significant burden on a company in terms of programming man-hours as well as money.

Additionally, some legacy software applications are stateless in that for a program or application state at a particular moment arrived at after a sequence of a number of other states, a legacy software application or program is unaware of the prior existing states. For example, in the event that a user updates an electronic shopping cart to include additional items, the legacy software application is privy only to the current shopping cart state. Sometimes these legacy software applications do not provide undo/redo capabilities, so that a prior existing state cannot be recalled via an undo action. Modifying program code of a legacy software application to include undo/redo functionality requires an enormous effort and, at times, might not be possible.

DETAILED DESCRIPTION

Figure 1:
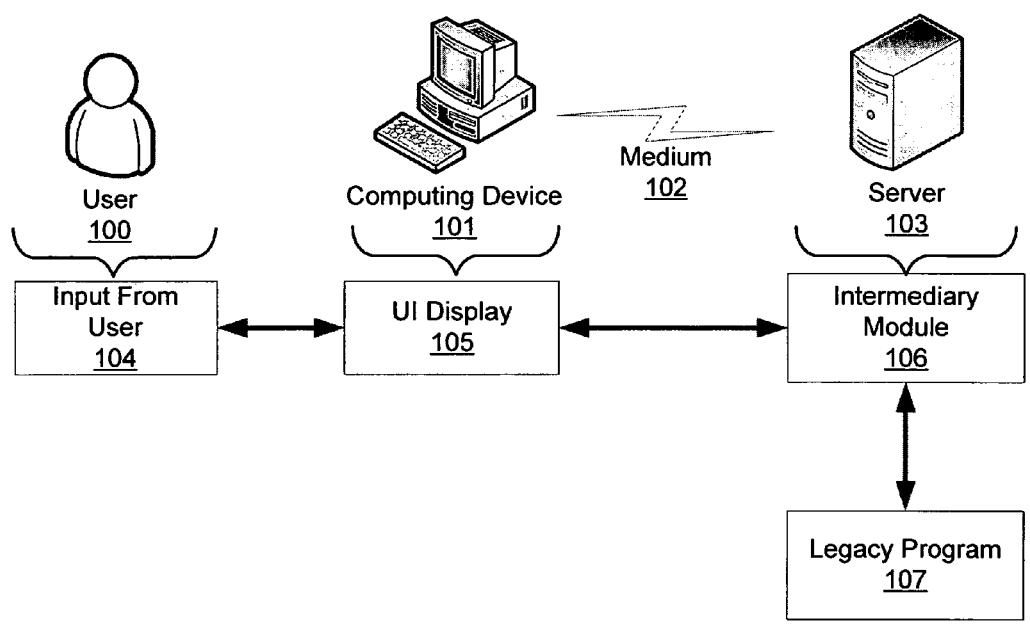
FIG. 1 is a diagram that illustrates example components of a system in which an example embodiment of the present invention may be implemented.

In order to promote not only code reusability, but also entire transactional logic reusability, data must be able to be transmitted to and accessed from the transactional logic of legacy software programs. However, if a UI layer is integrated with a transactional logic layer, there is not a method in the art to separate the code in order to access the transactional logic. Further, there is not a method in the art for extending functionality of legacy software programs, in particular, ones that have front-end UIs that are inseparable from backend transactional logic, to include undo/redo functionality.

Embodiments of the present invention relate to a computer system and method that may provide for upgrading a legacy application to include undo/redo functionality. U.S. patent application Ser. No. 11/411,463, filed Apr. 25, 2006 and entitled "Mapping A New User Interface Onto An Existing Integrated Interface," now issued as U.S. Pat. No. 7,784,022; the disclosure of which is incorporated herein in its entirety by reference, and which has a common assignee with the present application, provides for an intermediary that may serve as a surrogate user by mapping inputs by the user from a new first interface to an older second interface. For a user input by the processor as an instruction to perform an action, for example, using certain data input by the user or with already stored data, the processor may implement a hook function with the legacy application to operate the legacy application as would a user who interacts with the UI of the legacy application, to input commands to the legacy application and to receive responsive data from the legacy application. The intermediary may take data or messages that are returned by the older second interface, if any, back to the new interface for the user to manipulate. For each action instruction input by the processor to the legacy application during execution of the software upgrade, the processor may store in a command stack data corresponding to and identifying the action instruction.

The software upgrade may provide a UI via which the user may input a "Redo" and/or "Undo" command. In response to an Undo command, the processor, in executing the software upgrade, may serially run through the command stack from a first command at the bottom of the stack, i.e., a first one of the commands of the command stack to have been executed, until a command immediately prior to a command of the stack corresponding to a program state in which the Undo command was received. That is, if the latest executed command in the stack is command 'n', the processor serially runs through the command stack from command 1 to command n−1.

The command stack may be divided into two stacks, an "Undo stack" and a "Redo stack." The Undo stack may include a set of commands that includes a first command (i.e., command 1) through a command of a current program state, command n. In response to an Undo command, the processor may remove the latest (with respect to the sequence of execution) command, command n, from the Undo stack and place it in the Redo stack. In response to a Redo command, the processor, in executing the software upgrade, may remove from the Redo stack the last command added to the Redo stack, in this case command n, restore it to the Undo stack in a position of the latest command of the Undo stack, and serially run through the entire command stack from a first command at the bottom of the stack, i.e., from command 1 through command n. The precise position of the command n in the command stacks may depend on the particular memory storage logic used. For example, if a Last-In-First-Out (LIFO) memory is used, command n may be at the top of the Undo stack and at the bottom of the Redo stack. (With respect to the serial execution of the stored commands, however, the LIFO may operate as a First-In-First-Out (FIFO) memory.) Any suitably appropriate memory storage logic may be used, e.g., LIFO, FIFO, or any combination of LIFOs and FIFOs.

The computer programs may be written in any conventional computer language, and in particular in an object oriented computer language. Example computer languages that may be used to implement the computer system and method of the present invention may be Java, Extensible Markup Language (XML), C++, or a combination thereof. The computer programs may include event detection methods for detecting and responding to user interaction with a UI. The processor may be of any suitably appropriate computing device, e.g., a computer, personal digital assistant (PDA), laptop computer, notebook computer, mobile telephone, a hard-drive based device, or any device that can receive, send, store, and/or provide for display of data. The processor may include multiple processors, for example at different locations, where different ones of the multiple processors execute different portions of program code. For example, one processor may execute code for implementing a new UI, another processor may execute code for mapping the new UI with a legacy UI, and still another processor may execute code for performing underlying functions of the legacy program. Different ones of the multiple processors may be of different types of computing devices.

An example embodiment of the present invention may utilize a new UI operated in connection with an arrangement receiving input data from a user. An example embodiment of the present invention may further include an arrangement for transmitting data between components of the system. The arrangement may include, for example, a network device, router, ethernet cable, ethernet card, wireless card, etc, or any suitably appropriate combination thereof. An example embodiment of the present invention may further include an arrangement for mapping the received input data to a legacy UI. In an example embodiment of the present invention, an arrangement may transmit data from the legacy UI, and the arrangement for mapping data may map the data from the legacy UI to the new UI. An example embodiment of the present invention may include an arrangement for display of the new UI. The arrangement may include a laptop and/or desktop monitor, TV monitor, LCD display on a computing device, etc.

FIG. 1 illustrates components of an example system in which an example embodiment of the present invention may be implemented. A user 100 may input data 104 into a UI display 105, which could be a graphical display, text display, etc., on a computing device 101. The computing device 101 can be any hardware that has processing or computational capability, such as a laptop, handheld device, etc. The input may be entered via any suitable appropriate input device, such as a keyboard, mouse, speech recognition device, etc. The system may transactionally processes the information executing the software upgrade, or, in cases where the software upgrade interface has no integrated transactional logic for transactionally processing the data input, transfer the data input for transactional processing by execution of a legacy program 107. For example, the software upgrade may include a UI software module for receiving the data input, and an intermediary software module 106 for mapping between the software upgrade and the legacy program 107. The UI module and the intermediary module 106 and/or the legacy program 107 may be executed by different system components. In this instance, the system may transmit the data input at the computing device 101, for example, to a server 103 over a communication medium 102. The functional modules of embodiments of the present invention may be distributed across one or more servers 103 as appropriate. The computing device 101 and/or server 103 may include a memory device and may store database information. The communication medium 102 can be either intranet or Internet and over a wireless or wired communication, e.g., ethernet cable. Within the server 103, the intermediary module 106, may accept the transmitted data and map the data to the legacy program 107 for processing of the data. In one example embodiment, the legacy program 107 may have interface logic and transactional logic that are inseparable. The legacy program 107 may then communicate responsive data back to the intermediary module 106 which can in turn update the display 105.

Figure 2:
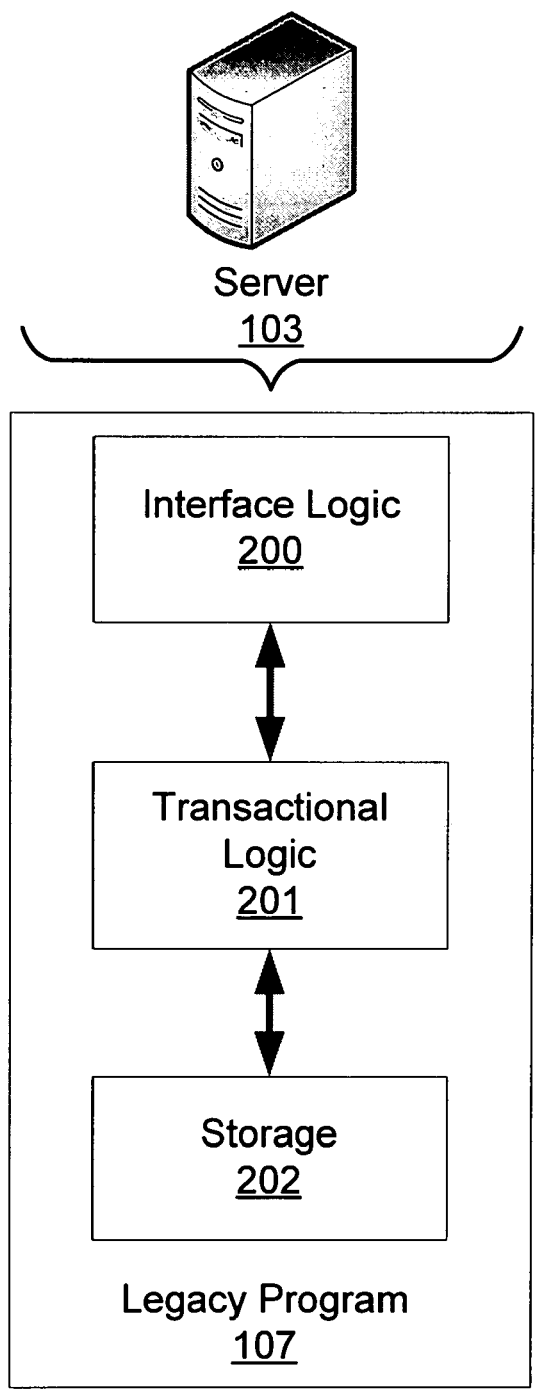
FIG. 2 is a block diagram that illustrates an example structure of a legacy program, according to an example embodiment of the present invention.

FIG. 2 illustrates an example structure of the legacy program 107 that is located at the server 103. The legacy program 107 may be an entire application unto itself, or could represent one of multiple components or modules of a larger integrated application that are located on and/or communicate between one or more servers. For example, software applications may be divided into components based on their functionality. The modularity of the components may allow each unit to be characterized by its transactional or functional logic. Transactional or functional logic is meant to represent the logic used to process data, wherein the logic can include business logic, such as programs relating to financials, sales, human resources, operations, marketing, strategic management, supply chain management, etc.

In FIG. 2, an interface logic 200 may receive data and transmit the received data to a transactional logic 201, which may directly return that information to the interface logic 200 for display to a user, and/or may update data on a server storage or a database 202.

Figure 3:
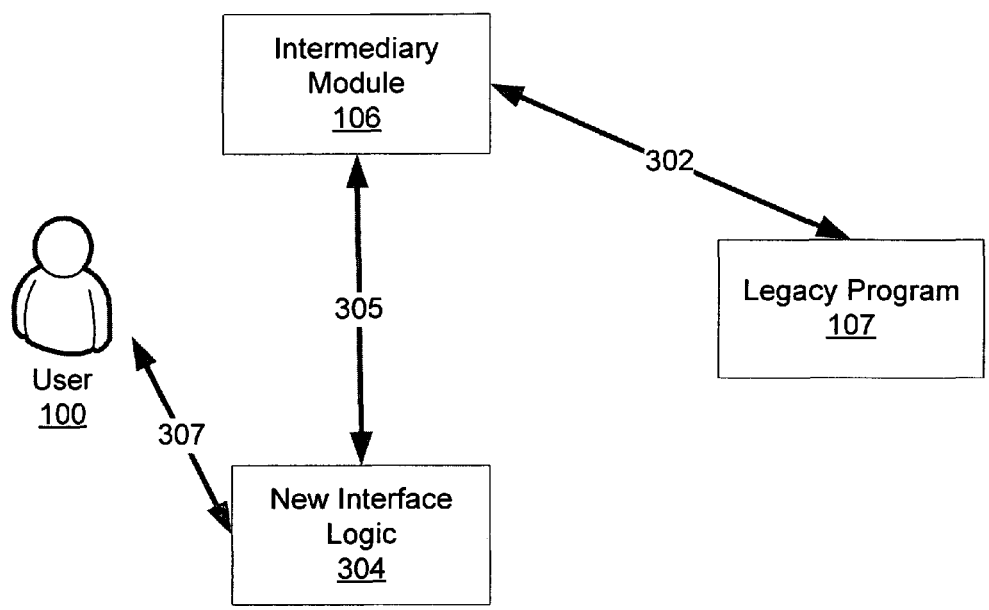
FIG. 3 is a block data flow diagram that illustrates an example of a software architecture and interaction of modules of the software architecture, according to an example embodiment of the present invention.

FIG. 3 illustrates an example embodiment of a software architecture and interaction of modules of the software architecture, according to an example embodiment of the present invention. The software architecture as a whole may include a program with a new UI utilizing transaction logic of a legacy program, for example, that implements an old UI, the code for which is inseparable from that of its transaction logic. The intermediary module 106 and the legacy program 107 may interact to change the state of data, manipulate the UI of a view, etc., in a software application. A new interface logic 304 may display (307) a view to a user 100. The user 100 may interact (307) with the new interface logic 304. The new interface logic 304 may provide/transmit (305) input data to the intermediary module 106, which may in turn provide/transmit (302) the data to the legacy program 107. The intermediary module 106 may interpret user commands, translate them into user interactions, actions, or events for the legacy program 107, and ultimately for transmission (307/305/302) of the interactions, actions, or events from the user 100 to the legacy program 107. The legacy program 107 may then process the data with transactional logic, e.g., to manipulate the state of the received data or other data, for example, that is in the storage 202 of FIG. 2. The legacy program 107 may also send messages, as well as provide data and attributes of the data back to the intermediary module 106. Any data or information transmitted back through to the intermediary module 106 may be mapped by the intermediary module 106 for transmission (305) of mapped data back to the new interface logic 304.

In an example embodiment of the present invention, the new interface logic 304 may be independent of transactional logic. As a result, the UI that is presented to the user may be adaptable and flexible so that changes, even significant ones, to the UI may be easily implemented. UIs may undergo significant changes, for example, either to adapt to changes in UI practice or to accommodate different classes of users. For example, a web or client UI may be adapted to particular user roles, such as a manager, an employee, a sales person, and an administrator. The interface logic may be provided so that it includes only the necessary screen logic to display information to a specific user, and to otherwise be devoid, at least for the most part, of any transactional logic of its own. Different interfaces may be independent of each other as well as of underlying transactional logic. The different interfaces and the underlying transactional logic may be implemented on the same hardware or on different hardware, such as on a web interface or a sub-GUI rich client installed on a computer other than the one on which the transactional logic is implemented, and may be viewed over the Internet or an intranet. These interfaces can also be adapted to work with different kinds of modules that contain various types of transactional logic.

The present invention is not limited to only modular software applications. Integrated applications, too, may take advantage of embodiments of the present invention. For example, an application in which UI and transactional logic code are integrated may require access to additional transactional logic on an older version. An intermediary module may be included in the transactional logic of the newer integrated application to act as the surrogate user to interact with the UI of the older version of the integrated application or another application.

Figure 4:
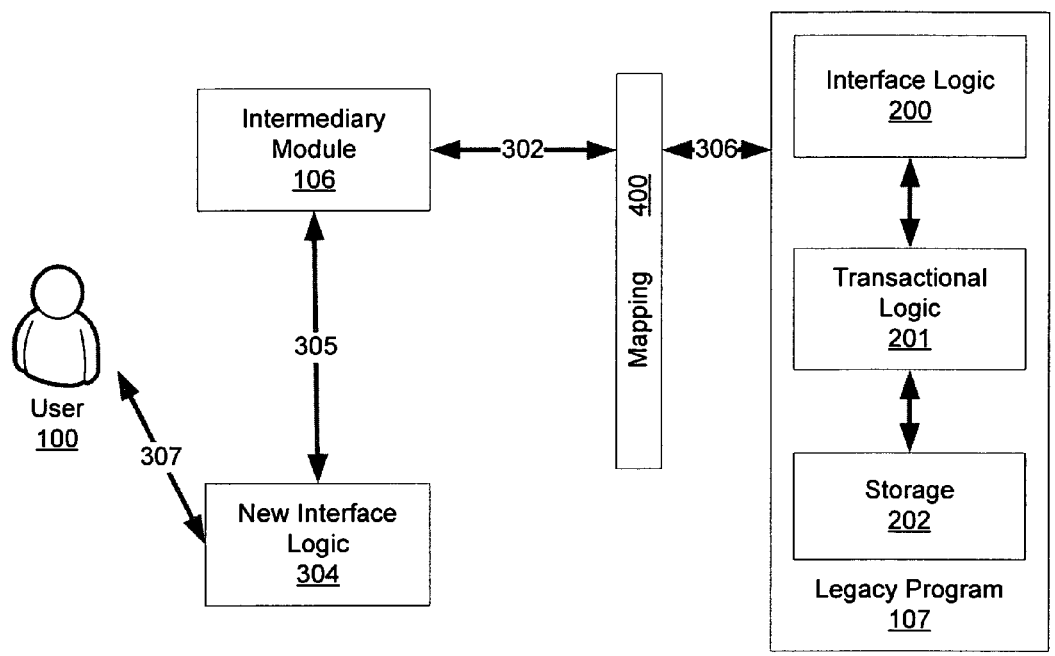
FIG. 4 is a block data flow diagram that illustrates the example embodiment of software architecture and interaction of modules of the software architecture of FIG. 3 expanded, according to an example embodiment of the present invention, to explain an intermediary process.

FIG. 4 illustrates the example embodiment of software architecture and interaction of modules of the software architecture of FIG. 3 expanded, according to an example embodiment of the present invention, to explain the intermediary process. With respect to FIG. 4, the transactional logic 201 of the legacy program 107 may be used to perform a function with data input by the user 100. One method of interacting between the intermediary module 106 and the transactional logic 201 is to have a mapping 400 that the intermediary module 106 uses to map data to correspond to inputs accepted by the interface logic 201. The intermediary module 106 may store some of the data and further provide/transmit (302) to the transaction logic 201 the entire set of data or a different set of data that includes a partial set of the input data and/or other information accessible to the intermediary module 106, through the mapping 400. Data and "set of data" can be used interchangeably depending on the type of data transmitted, the organization of the data objects, or transmission method. Data sent (302) through the intermediary module 106, either to the legacy program 107 or in the reverse route after processing, may be stored. For example, if updated information from the legacy program 107 is relayed (302) through the intermediary module 106 and used with newly input information 104, the data could be combined by the intermediary module 106 and transmitted (305) to the new interface logic 304 for update of the UI.

When the interface logic 200 of the legacy program 107 receives the mapped data (306), the transactional logic 201 may process the data and update data in storage 202 if necessary. Any messages, data, or attributes of data can be transmitted (306) to the mapping 400 for transmission (302) to the intermediary module 106. The intermediary module 106 can store the data or sets of data that are mapped back. The intermediary module 106 may provide the mapped data to the new interface logic 304. The new interface logic 304 may use any available data, attributes of the data, and mapping information, whether newly received from the legacy program 107 or previously stored by the software upgrade to provide (305) a new display to the user 100.

Figure 5:
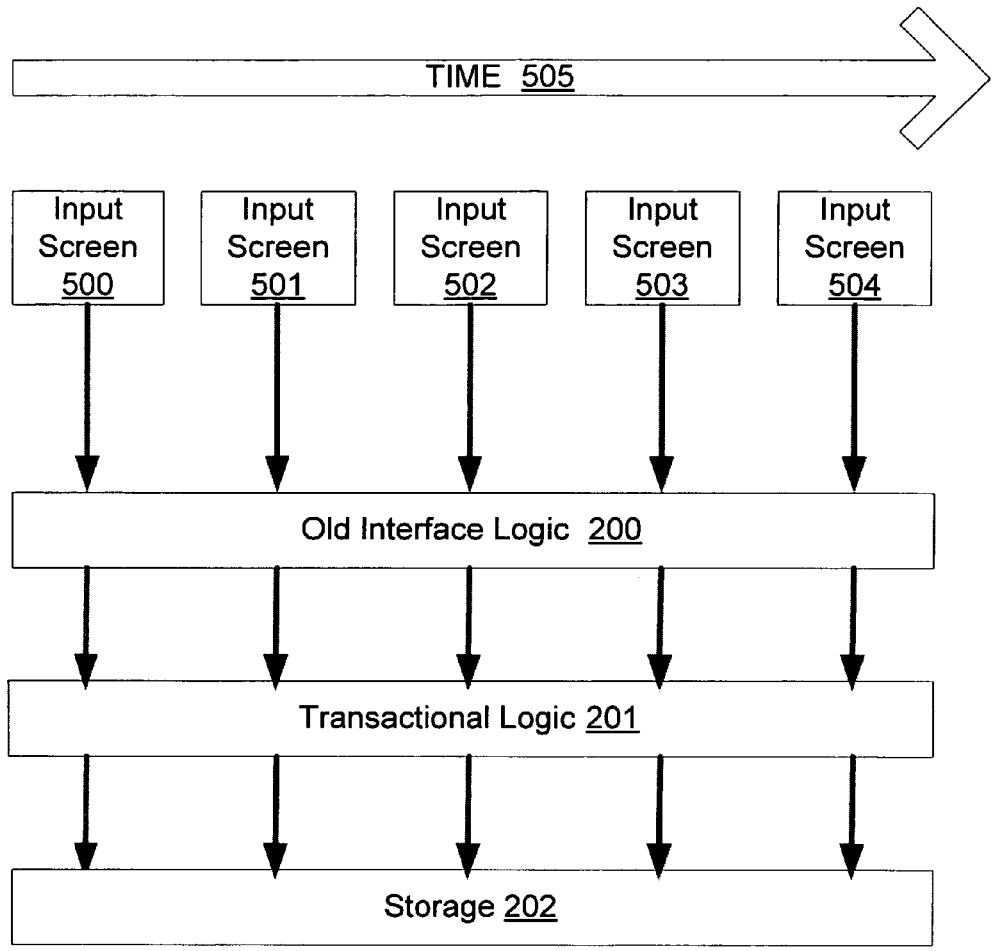
FIG. 5 is a diagram that illustrates an exemplary user interaction over time with a legacy program via a legacy provided UI.
Figure 6:
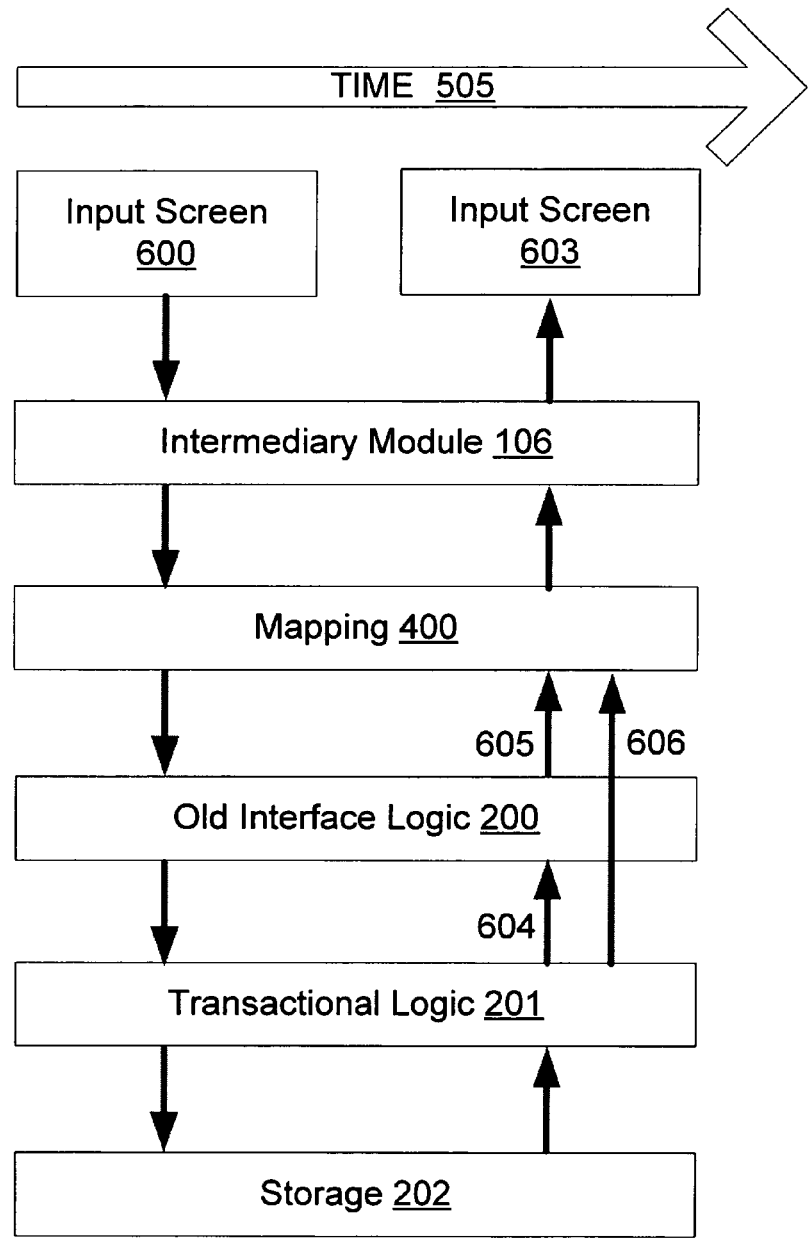
FIG. 6 is a diagram that illustrates an exemplary user interaction over time with a legacy program via a software upgrade provided UI, according to an example embodiment of the present invention.

FIGS. 5 and 6 illustrate an exemplary instance of modifying a UI by applying a software upgrade to a legacy program 107 using an intermediary module 106. FIG. 5 illustrates an exemplary user interaction with the transactional logic 201 via the exemplary legacy provided UI, and FIG. 6 illustrates an exemplary user interaction with the transaction logic 201 via the exemplary software upgrade provided UI and the intermediary module 106.

Referring to FIG. 5, the user 100 may be provided with a first input screen 500. The user may input data which is passed to the old interface logic 200, which may pass the data to the transactional logic 201 to be processed. The transactional logic 201 may update data in storage 202. The transactional logic 201 may process the data completely in the "dark," meaning that the user does not see the results of the processing, nor is the display necessarily updated at the end of the processing. Therefore, as time 505 progresses, the user 100 may receive new input screens 501, 502, 503, 504, etc. with which to input additional data, but without seeing the data dynamically updated on the interface. Meanwhile, the processing of the data may be performed in the background (201/202).

Referring to FIG. 6, over time 505, the user 100 may input data into input screens 600 and 603. However, these input screens may be using a new interface logic that may be in communication with the transactional logic 201 via the intermediary module 106 and mapping 400. Thus, data may be sent through the intermediary module 106, which may send data through the mapping 400 to the old interface logic 200, and may be processed by the transactional logic 201, which may potentially update data in the storage 202. Messages, data updates, and attributes of data are relayed back to the mapping 400 (either directly 606 or indirectly 604/605). The intermediary module 106 may provide the mapped data to the new interface logic to provide the user 100 with another input screen 603. The input screen 603 may correspond to the input screen 501 of FIG. 5, except that whereas the input screen 501 for receiving new data from the user 100 does not dynamically update the UI to correspond to the backend processing, the input screen 603 may be for receiving the same new data but may also dynamically update the UI so that during the backend processing, the user is not left in the dark.

Figure 7:
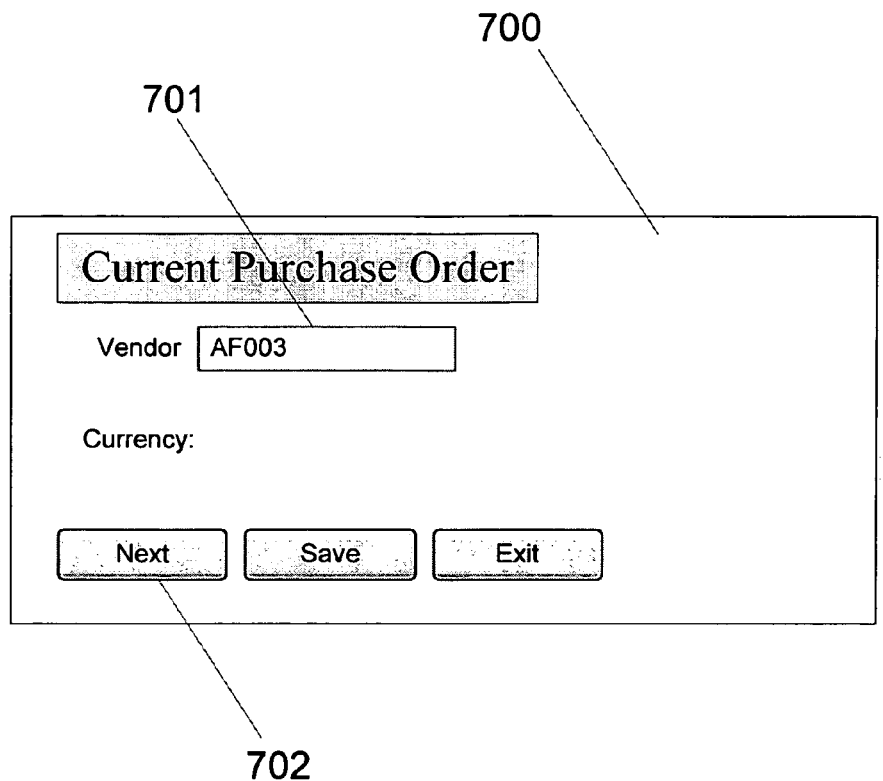
FIG. 7 illustrates an example UI corresponding to the UI provided in FIG. 5.
Figure 8:
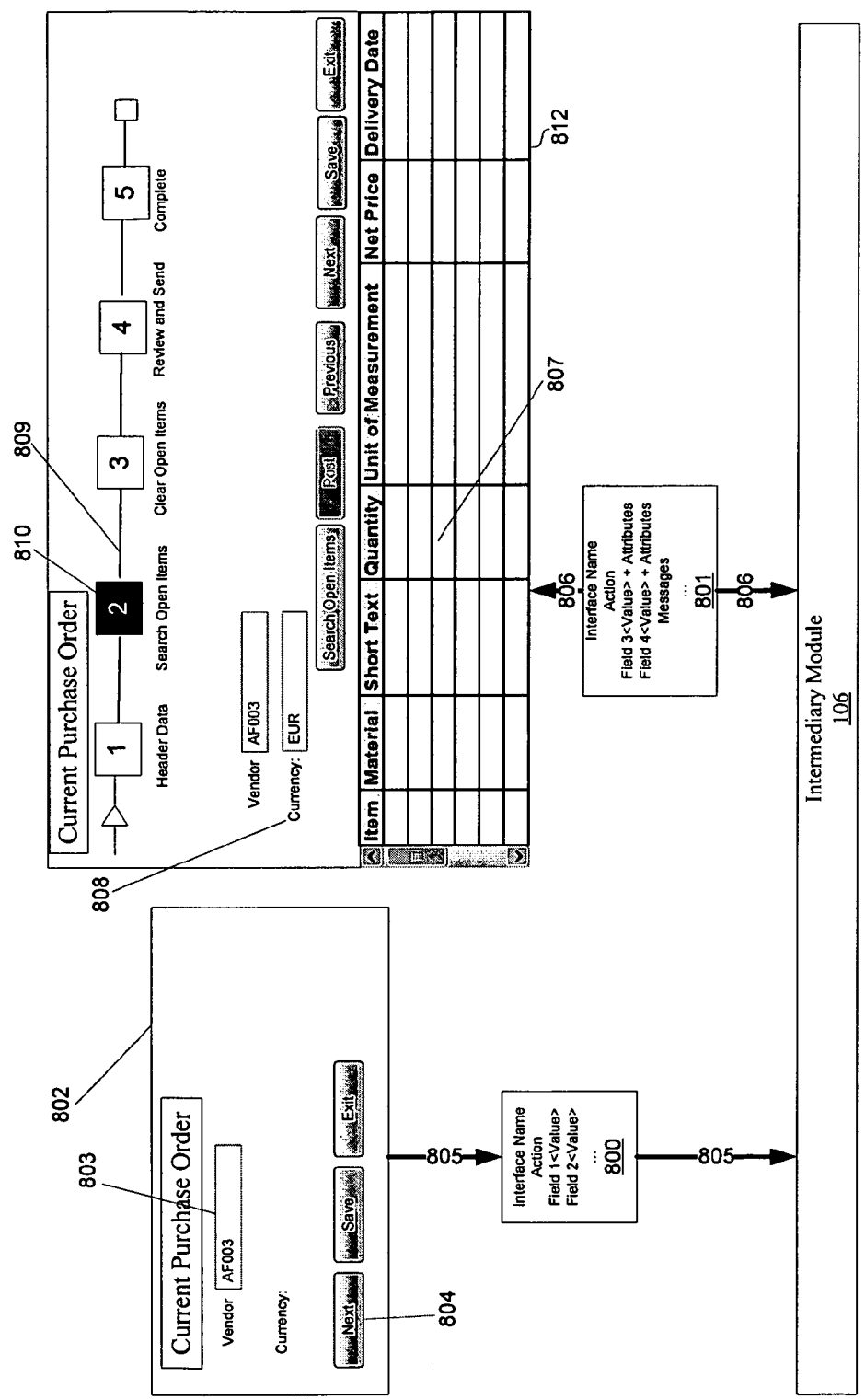
FIG. 8 illustrates an example UI corresponding to the UI provided in FIG. 6.

For example, FIGS. 7 and 8 show UIs corresponding to those of FIGS. 5 and 6. FIG. 7 depicts an example UI of an ERP application. The UI 700 may be represent the input screen 500 of FIG. 5 displayed to the user 100 by the legacy program 107 for receiving data input from the user 100. The user 100 may be able to input data 701 and then select "next" 702 to proceed to the next input screen 501. The processing may be performed in the background while the input screens are provided to the user, without providing to the user any representation of the processing.

FIG. 8 depicts an example where the intermediary module 106 communicates with the legacy program 107 to return a new user interface. The user 100 may input data 803 into an input screen 802. When the user selects "next" 804, instead of having all the processing running in the background with the user remaining unaware of the processing occurring, data 805 from the input screen 802 may be provided to the intermediary module 106. The data 800 may include input 803 from the input screen 802. The intermediary module 106 may send this information to the legacy program 107 for processing by the legacy program's transaction logic 201. The intermediary module 106 may receive and transmit any pertinent information to develop the new UI. For example, new data may include prior stored data 800 or messages, processed data, and data attributes 801 from the legacy program 107. The new interface logic 304 may use this data to dynamically create a new UI and provide the user with knowledge of the processing that occurred along with new information or related attributes of the data 807 and 808 in a new UI 812 corresponding to the input screen 603 of FIG. 6. The interface could also display to the user the process chain 809 as well as indicate where the user is in the interactive process 810.

Figure 9:
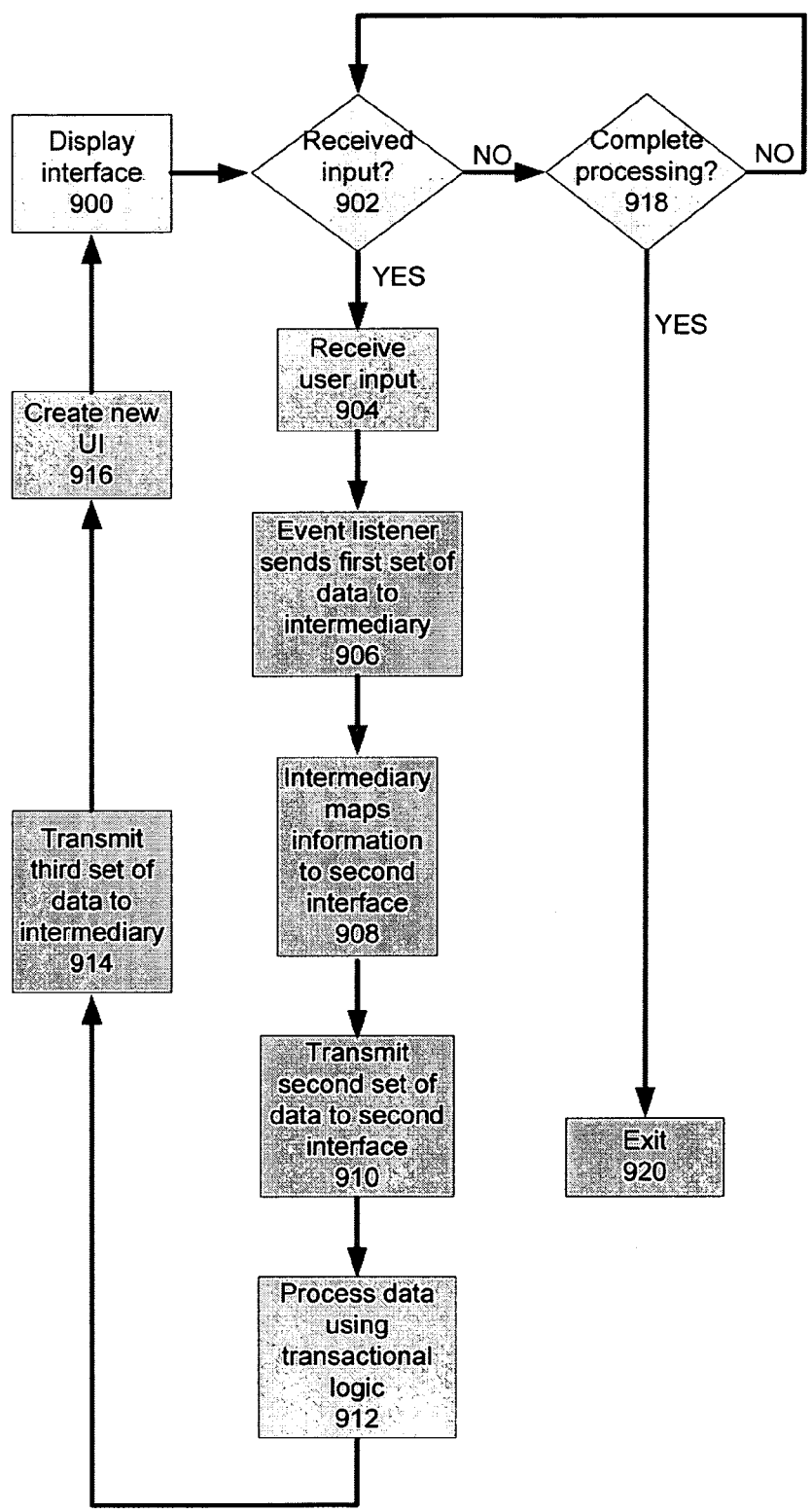
FIG. 9 is a flowchart that illustrates an exemplary process that may be performed to map and transmit information between a new UI to a legacy UI for processing by a legacy program, according to an example embodiment of the present invention.

FIG. 9 is a flowchart that illustrates an exemplary process that may be performed to map and transmit information between a new UI to an old UI for processing by a legacy program, according to an example embodiment of the present invention. At 900, a first new UI may be displayed. The new UI may be generated for display by execution of a software upgrade. At 902, the software program may await user input, for example, that may be input via any suitably appropriate input device, such as by a mouse click which selects data, a keyboard input, etc. Once this input is received at 904, an event listener may, at 906, provide this first set of data to an intermediary module. The intermediary module may, at 908, map the necessary data to a second interface. The intermediary module may then, at 910, transmit the data to the second interface, which may be the primary interface of the legacy program. Transactional logic of the legacy program may, at 912, process the data and updates storage as needed. A third set of data that includes processed data, retrieved data, and/or the second set of input data may be transmitted, at 914, to the intermediary module (either directly or indirectly). The intermediary module may map the data for processing by the new interface logic, which may, at 916, create a new UI for display to the user at 900. The cycle may be repeated unless it is indicated, at 918, that processing is complete. When processing is complete, the software application may be exited at 920.

Aside for extending legacy programs to be used with new UIs, a software upgrade may additionally or alternatively extend a legacy program that is stateless and that does not provide Undo/Redo functionality to include this functionality.

In an example embodiment of the present invention, a software upgrade for extending the legacy program to include Undo/Redo functionality may additionally provide a new UI that provides for receiving input of an instruction by the user 100 to perform an Undo/Redo function. In an alternative embodiment, the UI of the legacy program may be used, except that the software program may additionally provide for responding to an input command to which the legacy program is unresponsive. In response to the input of the command, the software program may be executed to hook into the legacy program as is described below to perform the Undo/Redo operation.

Figure 10:
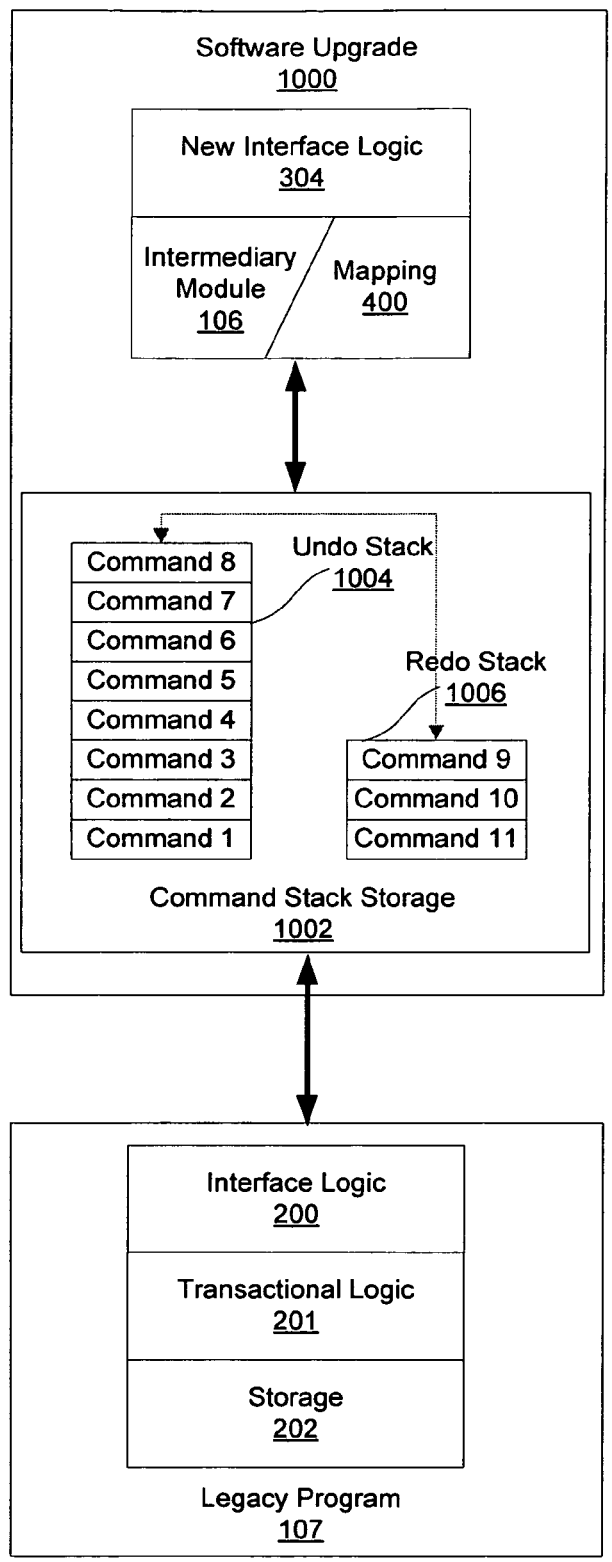
FIG. 10 is a block diagram that illustrates components of a system for extending a legacy program to include Undo/Redo functionality, according to an example embodiment of the present invention.

FIG. 10 is a block diagram that illustrates components of a system for extending the legacy program to include Undo/Redo functionality. In one example embodiment of the present invention, a software upgrade 1000 may include new interface logic 304, which may provide a completely new UI for interaction with a user 100, or may provide at least for input of Undo/Redo commands. The software upgrade 1000 may further include the intermediary module 106, and, if necessary, a mapping 400. The software upgrade 1000 may additionally include code for maintaining a command stack storage 1002. The software upgrade 1000 may interact with the legacy program 107, for example, via the interface logic 200.

The command stack may include an Undo stack 1004 and a Redo stack 1002. With respect to insertion into and removal from the stacks, the Undo and Redo stacks may be implemented using a LIFO memory logic. In one example embodiment, the stacks in their entirety may be represented in XML. Where mapping is required between commands for the software upgrade 1000 and the legacy program 107, the commands stored in the command stack storage 1002 may be previously mapped commands. Alternatively, they may be left in an unmapped state, for example, so that the command stack may be applied to different legacy applications. According to the latter embodiment, a new execution of mapping 400 may be required each time a command stack is applied to the legacy program 107.

For each action that the intermediary module 106 determines is to be performed by the legacy program in response to a user interaction with the new user interface 304, the software upgrade 1000 may store a new command in the Undo stack 1004, and may provide the command (mapped if necessary) to the interface logic 200 of the legacy program 107, so that the transactional logic 201 of the legacy program 107 executes the required transaction. (In an embodiment in which the legacy application's UI is implemented, the software upgrade 1000 may implement a hook function to capture the user input and responsive commands performed by the legacy program in the Undo stack 1004.) The stored command may include the input data required for the execution of the command. A first one of the stored commands of the Undo stack 1004, i.e., the bottom command of the stack in a LIFO implementation, may be independent of any stored data other than that provided with the input of the first command, i.e., the first command may be stateless.

In response to an Undo command, e.g., input by the user 100, the software upgrade 1000 may remove from the Undo stack 1004 its last stored command, i.e., the top most command of the stack in a LIFO implementation, and transfer it to the Redo stack 1006, i.e., the top of the Redo stack in a LIFO implementation. For implementing the Undo, the intermediary module 106 may interact with the interface logic 200 to apply in sequence each of the commands of the modified Undo stack 1004 to the legacy program 107, beginning with the oldest command and ending with the newest command, i.e., beginning with the bottom command and ending with the top command in a LIFO implementation. The state that existed when the last of the commands of the modified Undo stack (command n−1) was previously executed may thereby be recalled, since the command that was previously executed subsequent to command n−1 (command n) is not executed when performing the Undo operation. While the commands of the Undo stack 1004 may have been initially stored in the Undo stack 1004 in response to numerous user inputs, for example, such that a first command was included and executed in response to a first user instruction, a second command immediately following the first command (on top of the first command) was included and executed in response to a second user instruction input subsequent to the execution of the first command, the sequential execution of the commands for recalling a previous application state may be performed without any similar user intervention.

In response to a Redo command, e.g., input by the user 100, the software upgrade 1000 may remove from the Redo stack 1006 its last stored command, i.e., the top most command of the stack in a LIFO implementation, and transfer it to the Undo stack 1004, i.e., the top of the Undo stack in a LIFO implementation. For implementing the Redo, the intermediary module 106 may interact with the interface logic 200 to apply in sequence each of the commands of the modified Undo stack to the legacy program 107, beginning with the oldest command and ending with the newest command. The state that existed when the last of the commands of the modified Undo stack (command n) was previously executed may thereby be recalled, since it has been re-added to the Undo stack 1004.

A user may desire to undo or redo a number of commands in succession. Application of the commands of each iteration of the Undo stack 1004 to the legacy program 107 for execution of each iteration's commands may have a high processor time cost. In one example embodiment of the present invention, if the software upgrade 1000 receives input of undo or redo commands in quick succession, the software upgrade 1000, may first modify the command stacks in accordance with all of the received undo and/or redo commands, and subsequently apply the modified Undo stack 1004 to the legacy program for a single execution of the sequence of commands of the Undo stack 1004. For example, the software upgrade 1000 may wait a predetermined amount of time before applying the Undo stack 1004 to the legacy program 107. Alternatively, the software upgrade 1000 may provide for receiving an input by the user of the number of commands to be executed. For example, there may be an "Undo" button and "Undo Execute" button. The software upgrade 1000 may record each selection of the "Undo" button before selection of the "Undo Execute" button, in response to which a number of undo operations corresponding to the number of times the Undo button was selected may be executed. Alternatively, a field may be provided for entry of the number of undo or redo commands to be executed.

Figure 11:
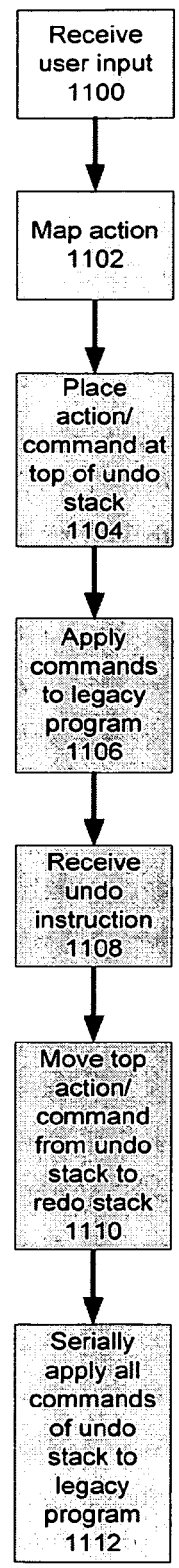
FIG. 11 is a flowchart that illustrates an exemplary process that may be executed for performing an undo operation, according to an example embodiment of the present invention.

FIG. 11 is a flowchart that illustrates an exemplary process that may be executed for performing an undo operation, according to an example embodiment of the present invention. At 1100, user input instructing the performance of an action may be received. At 1102, the action may be mapped to one or more commands for input to a legacy program. At 1104, the action or the commands may be placed at a top of an undo stack. If the actions, and not the commands, are stored in the undo stack, then 1102 and 1104 may be reversed. At 1106 the mapped commands may be applied to the legacy program.

At 1108, user input indicating an instruction to undo an immediately preceding action (or immediately preceding actions) may be received. At 1110, the top action or the top commands that correspond to the action may be removed from the undo stack and placed at the top of a redo stack. If the stacks include mapped commands, and not actions, the commands may be stored in the stacks with a reference to an action. For example, a field may be included for five commands associated with an action. The field may include, for example, a number. For example, if in response to each new action a number may be incremented and the commands ma be associated with the number of the commands' corresponding actions. This is only one exemplary way to demarcate a group of commands corresponding to a single action. For example, instead of the above-described number field, demarcations may be placed in the stack between command groups. In yet another alternative embodiment, each of the undo and redo stack may include two stacks, one including actions, and one including mapped commands. The stack including actions may be used for mapping of the top action to commands to determine a number of commands to be removed from the top of the command stack.

At 1112, all of the actions or commands of the modified undo stack may be applied serially to the legacy program. If the undo stack includes actions, and not commands, 1112 may include mapping the actions to commands.

Figure 12:
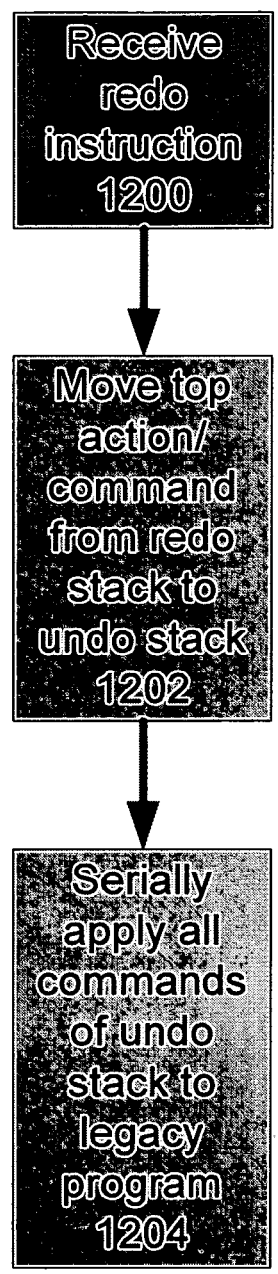
FIG. 12 is a flowchart that illustrates an exemplary process that may be executed for performing a redo operation, according to an example embodiment of the present invention.

FIG. 12 is a flowchart that illustrates an exemplary process that may be executed for performing a redo operation, according to an example embodiment of the present invention. At 1200, user input indicating an instruction to redo an immediately preceding undone action (or actions) may be received. At 1202, the top action or the top commands that correspond to the action may be removed from the redo stack and placed at the top of the undo stack. At 1204, all of the actions or commands of the modified undo stack may be applied serially to the legacy program. If the undo stack includes actions, and not commands, 1202 may include mapping the actions to commands.

In an example embodiment of the present invention, if a new action is performed after an undo operation, the redo stack 1006 may be cleared.

Figure 13:
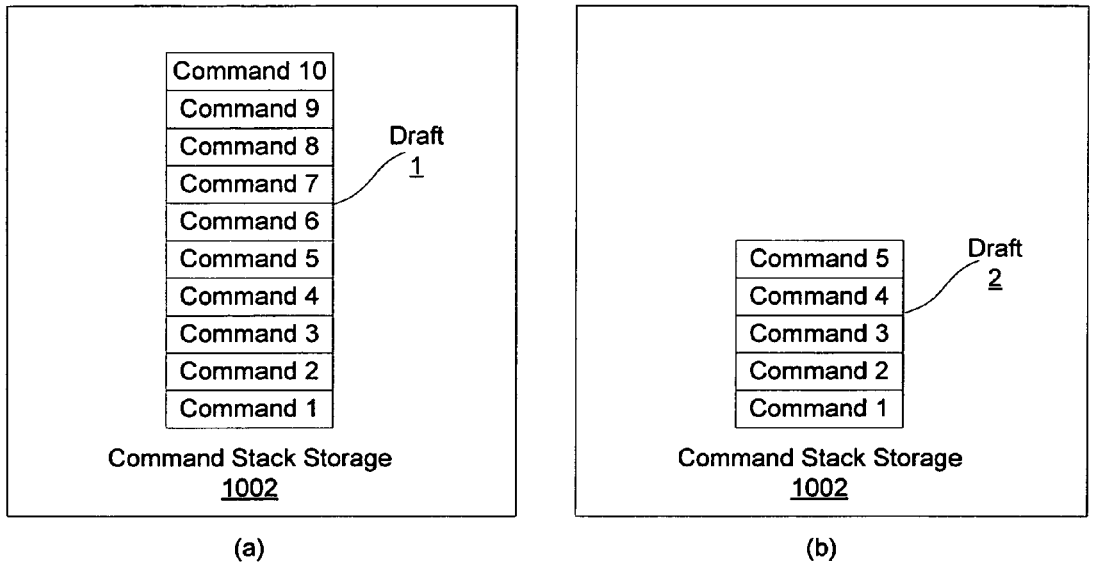
FIG. 13 is a block diagram that illustrates two saved versions of a data product, according to an example embodiment of the present invention.

In an example embodiment of the present invention, drafts or versions of a data product may be saved by saving the command stack 1002. A data product may be, e.g., an electronic document or electronic work area. An electronic work area may include a number of separate but associated data elements. For example, a work area may include a number of electronic documents that are somehow associated. The association may be, e.g., in that all of the electronic documents relate to a same particular business venture. For example, FIG. 13, part (a) shows the command stack 1002 saved as draft 1, including 5 commands, and FIG. 13, part (b) shows the command stack 1002 saved as draft 2, including 10 commands. When a draft is loaded, the system and method may serially apply the commands of the draft's command stack to the legacy program. In one example embodiment, after saving and exiting a draft, the redo stack may be cleared so that the saved command stack 1002 includes only a single set of commands. In an alternative embodiment, the command stack including the undo stack 1004 and the redo stack 1006 may be saved as the draft.

Those skilled in the art can appreciate from the foregoing description that the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method for providing an undo functionality in a legacy application in which an undo command is unsupported, comprising:

executing, by a processor, an intermediary application for:
providing a first user interface via which to receive user input of an undo command to obtain a prior application state instead of a current application state;
maintaining a first command identification stack that includes identifications of previously executed commands that were executed by the legacy application; and
responding to the user-input undo command by:
removing one of the identifications of previously executed commands from the first command identification stack, wherein the one identification being removed corresponds to one user interface command previously performed and targeted to be undone in response to the user-input undo command; and
subsequently interacting with the legacy application; and
executing, by the processor and in accordance with the interaction, the legacy application to re-execute in sequence the commands identified by remaining identifications of the first command identification stack, the sequence of commands re-executed (a) not including the command whose identification has been removed from the first command identification stack, and (b) effecting the prior application state.

2. The method of claim 1, wherein the re-execution is performed without intervention by a user between different ones of the commands identified by the remaining identifications of the first command identification stack.

3. The method of claim 2, wherein, during a first execution of the commands identified by the remaining identifications of the first command identification stack, prior to the removing step, the commands identified by the remaining identifications of the first command identification stack are executed with intervention by the user between different ones of the commands, the intervention including an instruction to execute a next one of the commands.

4. The method of claim 1, further comprising:
storing in memory data input by a user for execution of at least one of the previously executed commands and associating the data input by the user with the at least one of the previously executed commands for execution of which the user input the data.

5. The method of claim 4, wherein the re-execution includes executing the at least one of the previously executed commands using the user input data associated with the at least one of the previously executed commands.

6. The method of claim 1, wherein the method further comprises, responsive to the user-input undo command, storing the removed command identification in a second command identification stack.

7. The method of claim 6, further comprising:
responsive to a user-input redo command obtained subsequent to the re-execution:
removing the removed command from the second command identification stack;
adding the removed command back to the first command identification stack; and
subsequent to the step of adding the removed command back to the first command identification stack, implementing the legacy application to re-execute in sequence the commands identified by the identifications of the first command identification stack.

8. The method of claim 6, further comprising:
responsive to a user-input redo command obtained subsequent to the re-execution:
removing the removed command from the second command identification stack;
adding the removed command back to the first command identification stack; and
implementing the legacy application to execute the removed command.

9. The method of claim 1, further comprising:
storing the first command identification stack modified by the removal of the removed identification as a version of an application work area; and
responsive to a command to open the version, re-executing in sequence the commands identified by the identifications of the modified first command identification stack.

10. The method of claim 1, further comprising:
prior to receipt of the user input undo command, receiving via the intermediary application one or more user input; and
mapping each of the one or more user input to respective ones of the commands identified in the first command identification stack for input to the legacy application for execution of the commands identified in the first command identification stack.

11. The method of claim 10, wherein:
the first user interface provides for receipt of the commands identified by the first command identification stack, the first user interface including an undo button via which to input the undo command, and the legacy application provides a second user interface for receipt of the commands identified by the first command identification stack, the second user interface not including any control via which to input the undo command;
a user interacts with the first user interface to input the commands identified by the first command identification stack; and
responsive to the user-input undo command, the intermediary program causes the legacy program to perform the re-execution by interacting with the legacy program to mimic input of the first set of commands identified by the first command identification stack into the second user interface.

12. A computer-readable medium having stored thereon instructions adapted to be executed by a processor, the instructions which, when executed, cause the processor to perform the method of claim 1.

13. A system for providing an undo functionality in a legacy application in which an undo command is unsupported, comprising:
a memory; and
a processor configured to:
execute an intermediary application for:
providing a first user interface via which to receive user input of an undo command to obtain a prior application state instead of a current application state;
storing in the memory a first command identification stack that includes identifications of previously executed commands that were executed by the legacy application; and
responding to the user-input undo command by:
removing one of the identifications of previously executed commands from the first command identification stack, wherein the one identification being removed corresponds to one user interface command previously performed and targeted to be undone in response to the user-input undo command; and subsequently interacting with the legacy application; and execute, in accordance with the interaction, the legacy application to re-execute in sequence the commands identified by the remaining identifications of the first command identification stack, the sequence of commands re-executed (a) not including the command whose identification has been removed from the first command identification stack, and (b) effecting the prior application state.

14. The system of claim 13, wherein the re-execution is performed without intervention by a user between different ones of the commands identified by the remaining identifications of the first command identification stack.

15. The system of claim 14, wherein, during a first execution of the commands identified by the remaining identifications of the first command identification stack, prior to the removing, the commands identified by the remaining identifications of the first command identification stack are executed with intervention by the user between different ones of the commands, the intervention including an instruction to execute a next one of the commands.

16. The system of claim 13, wherein the memory stores a data input by a user for execution of at least one of the previously executed commands and the data input by the user is associated with the at least one of the previously executed commands for execution of which the user input the data.

17. The system of claim 16, wherein the re-execution includes executing the at least one of the previously executed commands using the user input data associated with the at least one of the previously executed commands.

18. The system of claim 13, wherein the system is further configured to, in response to the user-input undo command, store the removed command identification in a second command identification stack.

19. The system of claim 18, wherein the system is further configured to, in response to a user-input redo command obtained subsequent to the re-execution:
remove the removed command from the second command identification stack;
add the removed command back to the first command identification stack; and
subsequent to the adding of the removed command back to the first command identification stack, implementing the legacy application to re-execute in sequence the commands identified by the identifications of the first command identification stack.

20. The system of claim 13, wherein:
the first command identification stack modified by the removal of the removed identification is stored as a version of an application work area; and
the system is configured to, responsive to a command to open the version, re-execute in sequence the commands identified by the identifications of the modified first command identification stack.

21. The system of claim 13, wherein:
prior to receipt of the user input undo command, one or more user input is received via the intermediary application; and
each of the one or more user input is mapped to respective ones of the commands identified in the first command identification stack for input to the legacy application for execution of the commands identified in the first command identification stack.

22. The system of claim 21, wherein:
the first user interface for receipt of the commands identified by the first command identification stack, the first user interface including an undo button via which to input the undo command; and
the legacy application provides a second user interface for receipt of the commands identified by the first command identification stack, the second user interface not including any control via which to input the undo command;
a user interacts with the first user interface to input the commands identified by the first command identification stack; and
responsive to the user-input undo command, the intermediary program causes the legacy program to perform the re-execution by interacting with the legacy program to mimic input of the commands identified by the first command identification stack into the second user interface.

23. A method for providing a redo functionality in legacy application in which a redo command is unsupported, comprising:
executing, by a processor, an intermediary application for:
providing a first user interface via which to receive user input of a redo command to obtain a prior application state instead of a current application state;
store in a memory an undo stack that includes identifications of previously executed commands that were executed on the legacy application;
store in the memory a redo stack that includes identifications of previously executed commands that were executed on the legacy application and then reversed; and
responding to the user-input redo command by:
removing at least one latest-entered identification of the redo stack, wherein the at least one latest-entered identification being removed corresponds to at least one user interface command previously performed and reversed, and targeted to be redone in response to the user-input redo command;
adding the removed at least one latest-entered identification to the undo stack; and
subsequently interacting with the legacy application; and
executing, by the processor and in accordance with the interaction, the legacy application to re-execute in sequence the commands identified by remaining identifications of the undo stack, the sequence of commands re-executed (a) including the at least one command whose at least one identification has been removed from the redo stack, and (b) effecting the prior application state.

24. A method for providing an undo functionality in a legacy application in which an undo command is unsupported, comprising:
executing, by a processor, an intermediary application for:
providing a first user interface via which to receive user input of an undo command, the user-input undo command being input by the user activating an undo button a plurality of times in quick succession to obtain a prior application state instead of a current application state;

maintaining a first command identification stack that includes identifications of previously executed commands that were executed by the legacy application; and responding to the plurality of activations of the undo button collectively by:

removing, from the first command identification stack, identifications of a plurality of latest-entered ones of the previously executed commands, the number of removed identifications corresponding to a number of the plurality of times of the activation of the undo button, wherein the identifications being removed correspond to a plurality of user interface commands previously performed and targeted to be undone in response to the user-input undo command; and subsequently interacting with the legacy application; and executing, by the processor and in accordance with the interaction, the legacy application to re-execute in sequence the commands identified by remaining identifications of the first command identification stack, the re-execution being performed only once for all of the plurality of times of the activation in quick succession of the undo button, and the sequence of commands re-executed (a) not including the commands whose identifications have been removed from the first command identification stack, and (b) effecting the prior application state.

25. A computer-implemented method for providing a redo functionality in a legacy application in which a redo command is unsupported, comprising:

in response to a user-input redo instruction to obtain a prior application state instead of a current application state, the user-input redo instruction being input by activation of a graphical redo button displayed in a graphical user interface provided by an intermediary application:

the intermediary application being executed by a computer processor for:

removing, from a redo stack, a latest-entered identification of a previously executed command that was executed on the legacy application, wherein the identification being removed corresponds to a user interface command previously performed and undone, and targeted to be redone in response to the user-input redo instruction;

adding the latest-entered identification to an undo stack; and mimicking user input of the previously executed command identified by the removed latest-entered identification into a graphical user interface of the legacy application; and the legacy application being executed by the computer processor for executing the previously executed command identified by removed latest-entered identification in response to the mimicked user input, wherein the user interface of the legacy application does not include a graphical redo button, and wherein the re-executed command (a) is the command whose identification was removed from the redo stack, and (b) effects, by its re-execution, the prior application state.

26. A computer-implemented method for providing a undo functionality in a legacy application in which a undo command is unsupported, comprising:

in response to a user-input undo instruction to obtain a prior application state instead of a current application state, the user-input undo instruction being input by activation of a graphical undo button displayed in a graphical user interface provided by an intermediary application:

the intermediary application being executed by a computer processor for:

removing, from an undo stack that includes identifications of a plurality of previously executed commands, a latest-entered one of the identifications, wherein the one identification being removed corresponds to one user interface command previously performed and targeted to be undone in response to the user-input undo instruction; and subsequent to the removal, sequentially mimicking user input of each of the commands identified by remaining identifications of the undo stack into a graphical user interface of the legacy application; and the legacy application being executed by the computer processor for executing each of the commands identified by the remaining identifications in response to the mimicked user input, wherein the user interface of the legacy application does not include a graphical undo button, and wherein commands being re-executed (a) does not include the command whose identification was removed from the undo stack, and (b) effects, by its re-execution, the prior application state.

* * * * *